US008565931B2

United States Patent
Marwah et al.

(10) Patent No.: US 8,565,931 B2
(45) Date of Patent: Oct. 22, 2013

(54) MANAGING ENERGY DEMAND IN AN INFRASTRUCTURE

(75) Inventors: Manish Marwah, Palo Alto, CA (US); Ratnesh Kumar Sharma, Fremont, CA (US); Amip J. Shah, Santa Clara, CA (US); Thomas W. Christian, Fort Collins, CO (US); Cullen E. Bash, Los Gatos, CA (US); Chandrakant Patel, Fremont, CA (US); Martin Arlitt, Calgary (CA); Geoff M. Lyon, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 457 days.

(21) Appl. No.: 12/913,368

(22) Filed: Oct. 27, 2010

(65) Prior Publication Data

US 2012/0109391 A1      May 3, 2012

(51) Int. Cl.
     *G05D 11/00*      (2006.01)
     *G05B 13/02*      (2006.01)

(52) U.S. Cl.
     USPC .............. 700/295; 700/28; 700/291; 700/296

(58) Field of Classification Search
     None
     See application file for complete search history.

(56) References Cited

U.S. PATENT DOCUMENTS

| | | | |
|---|---|---|---|
| 4,971,136 A * | 11/1990 | Mathur et al. | 165/240 |
| 7,197,433 B2 | 3/2007 | Patel et al. | |
| 7,274,975 B2 | 9/2007 | Miller | |
| 7,653,499 B2 | 1/2010 | Corrado et al. | |
| 2005/0228618 A1 * | 10/2005 | Patel et al. | 702/188 |
| 2007/0260405 A1 * | 11/2007 | McConnell et al. | 702/24 |
| 2009/0157333 A1 * | 6/2009 | Corrado et al. | 702/61 |
| 2010/0023239 A1 | 1/2010 | Self et al. | |
| 2010/0222934 A1 * | 9/2010 | Iino et al. | 700/291 |

FOREIGN PATENT DOCUMENTS

WO      2009070159 A1      6/2009

OTHER PUBLICATIONS

Sharma, Ratnesh K., Rocky Shih, Cullen Bash, and Chandrakant Patel, "On building Next Generation Data Centers", Compute, Jan. 18-20, 2008, Bangalore, Karnataka, India.

* cited by examiner

*Primary Examiner* — Sean Shechtman

(57) ABSTRACT

In a method for managing energy demand in an infrastructure, a coefficient of performance (COP) of the infrastructure as a function of time is determined. The COP is a measure of efficiency of the infrastructure. In addition, an energy demand on the infrastructure as a function of time is determined and an energy demand schedule for the infrastructure that temporally reallocates the energy demand based upon the determined COP of the infrastructure is determined.

18 Claims, 4 Drawing Sheets

MANAGING ENERGY DEMAND IN AN INFRASTRUCTURE

BACKGROUND

A data center may be defined as a location, for instance, a room that houses computer systems arranged in a number of racks. Increases in the sizes and the densities of data centers has resulted in drastic increases in the power consumed by the computer systems and the cooling systems to cool the computer systems. This increase in power consumption has also resulted in drastic increases in the costs associated with operating the data centers.

With the emergence of dynamic or time-based pricing offered by utility companies for electricity and other energy, energy demand management is being used to "re-shape" the energy demand profile of customers/clients of the utility companies in order to reduce or minimize energy costs. In other words, for instance, some data center operators temporally redistribute the energy demand of the data center, within some constraints, such that the greatest energy demand occurs when the cost for the energy is the cheapest. Although such techniques often result in cost savings, additional techniques for reducing the costs associated with operating the data center would be beneficial.

BRIEF DESCRIPTION OF THE DRAWINGS

Features of the present disclosure will become apparent to those skilled in the art from the following description with reference to the figures, in which.

DETAILED DESCRIPTION

Figure 1:
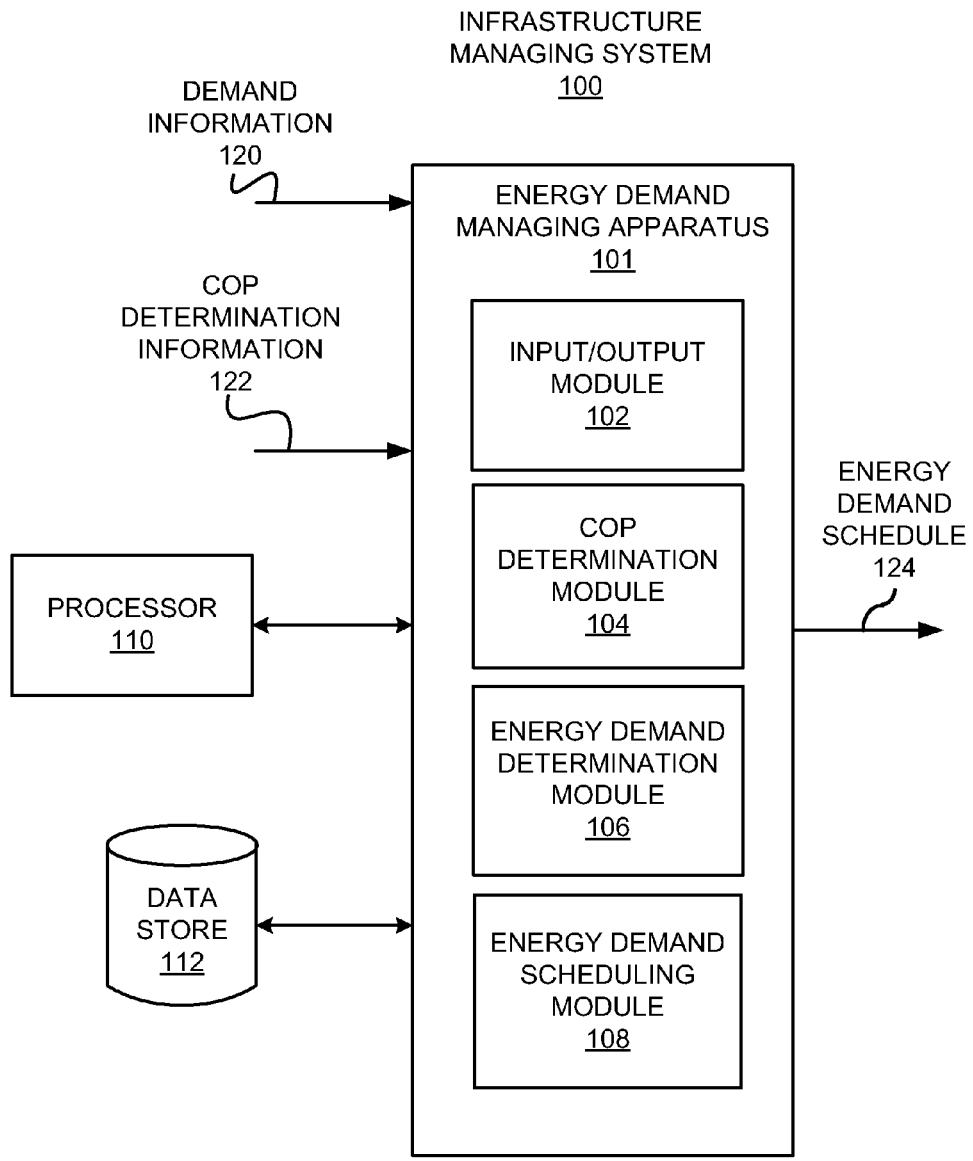
FIG. 1 shows a simplified block diagram of an infrastructure managing system for managing energy demand in an infrastructure, according to an example of the disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein is a method for managing energy demand in an infrastructure, according to an example. Also, disclosed herein is an apparatus for managing energy demand in an infrastructure, according to an example. As described in greater detail below, an aggregate coefficient of performance (COP) of an infrastructure, such as but not limited to, a data center, a rack of electronic components, a server housing heat generating components, a building, etc., is considered in energy demand management decisions, such as but not limited to, energy demand scheduling decisions. More particularly, for instance, the energy demand decisions may include migrating the energy demand from time periods at which the COP is relatively low to time periods at which the COP is relatively high. The energy demand management decisions may also be made based upon the COP and the energy cost.

Through implementation of the method and apparatus disclosed herein, the energy demand management decisions for the infrastructure are based on the COP of the infrastructure as a function of time. The energy demand management decisions may also be based upon the COP and energy costs as a function of time. As such, the energy demand management decisions may not just be based on the cost of the energy supplied to the infrastructure, but instead, may be made while considering fluctuations in the efficiency of the infrastructure over time. This consideration may lead to additional reductions in the costs associated with operating the infrastructure.

Throughout the present disclosure, the term "n" following a reference numeral is intended to denote an integer value that is greater than 1. In addition, the terms "a" and "an" are intended to denote at least one of a particular element.

With reference first to FIG. 1, there is shown a block diagram of an infrastructure managing system 100 for managing energy demand in an infrastructure, according to an example. It should be understood that the infrastructure managing system 100 may include additional components and that one or more of the components described herein may be removed and/or modified without departing from a scope of the infrastructure managing system 100.

The infrastructure managing system 100 includes an energy demand managing apparatus 101, a processor 110, and a data store 112. Generally speaking, the infrastructure managing apparatus 101 is configured to perform energy demand management while incorporating end-to-end efficiency of an infrastructure, as measured by an aggregate COP of the infrastructure, in addition to the cost of the supply-side energy from a supplier, for instance, a utility provider. The aggregate COP of the infrastructure is a measure of efficiency of the infrastructure with respect to one or more sustainability metrics, such as but not limited to, energy consumption, carbon emissions, exergy, toxicity, etc. In addition, the energy demand managing apparatus 101 may determine an energy demand schedule 124 that temporally reallocates the energy demand based upon the determined COP of the infrastructure. For example, the energy demand managing apparatus 101 is configured to determine an energy demand schedule 124 that maximizes energy demand during periods of the highest COP and minimizes energy demand during periods of the lowest COP. The energy demand managing apparatus 101 may consider other factors, such as but not limited to, terms in a service level agreement (SLA), or constraints other than the COP and energy costs, in determining the energy demand schedule 124.

The energy demand managing apparatus 101 is configured to be implemented and/or executed by the processor 110, which may comprise a microprocessor, a micro-controller, an application specific integrated circuit (ASIC), and the like. Thus, for instance, the infrastructure managing system 100 may comprise a computing device and the energy demand managing system 101 may comprise an integrated and/or add-on hardware device of the computing device. As another example, the energy demand managing apparatus 101 may comprise a computer readable storage device (not shown)

upon which is stored one or more computer programs, which the processor 120 is configured to execute.

The energy demand managing apparatus 101 includes an input/output module 102, a COP determination module 104, an energy demand determination module 106, and an energy demand scheduling module 108. The modules 102-108 may comprise modules with machine readable instructions, hardware modules, or a combination of modules with machine readable instructions and hardware modules. Thus, in one example, one or more of the modules 102-108 comprise circuit components. In another example, one or more of the modules 102-108 comprise machine readable instructions stored on a computer readable storage medium, which the processor 110 is configured to execute. As such, in one example, the energy demand managing apparatus 101 comprises a hardware device, such as but not limited to, a computer, a server, a circuit, etc. In another example, the energy demand managing apparatus 101 comprises a computer readable storage medium upon which machine readable instructions for performing the functions of the modules 102-108 is stored. The various functions that the energy demand managing apparatus 101 performs are discussed in greater detail hereinbelow.

The input/output module 102 is configured to access information, for instance, to receive information from infrastructure components (as shown for instance within FIG. 2 and discussed hereinbelow) of the infrastructure or alternately access information previously received and stored in the data store 112, that the energy demand managing apparatus 101 may use to determine an aggregate COP of the infrastructure as a function of time, hereinafter referred to as COP determination information 122. The COP may be defined as a measure of efficiency of an infrastructure component with respect to one or more sustainability metrics, such as but not limited to, energy consumption, carbon emissions, exergy, toxicity, etc. In addition, the aggregate COP is the aggregate of the COPs of the infrastructure components contained in the infrastructure.

The input/output module 102 is also configured to access information that may be used to determine an energy demand on the infrastructure or the infrastructure components 202a-202n as a function of time, hereinafter referred to as demand information 120. The demand information 120 may include power demand information received from the infrastructure components 202a-202n or retrieved from the data store 112. The input/output module 102 may also receive and/or retrieve other information that the energy demand managing apparatus 101 may employ in determining the energy demand schedule for the infrastructure, such as but not limited to, terms of service level agreements (SLAs), constraints regarding the total energy demand available during a particular time period, constraints regarding performance of various demand specifications, etc.

The COP determination module 104 is configured to determine the aggregate COP of the infrastructure using the COP determination information 122. For instance, the COP determination module 104 may determine the aggregate COP as described in detail hereinbelow with respect to the method 300 depicted in FIG. 3.

The energy demand determination module 106 is configured to determine an energy demand on the infrastructure as a function of time using the demand information 120. For instance, the energy demand determination module 106 may determine the energy demand as described hereinbelow with respect to the method 300 depicted in FIG. 3.

The energy demand scheduling module 108 is configured to determine an energy demand schedule 124 for the infrastructure that substantially temporally reallocates the energy demand based upon the determined COP of the infrastructure. More particularly, for instance, the energy demand scheduling module 108 is configured to determine an energy demand schedule 124 for the infrastructure that substantially maximizes energy demand on the infrastructure during time periods at which the COP of the infrastructure is the highest and that substantially minimizes energy demand on the infrastructure during time periods at which the COP is the lowest. The determination of the energy demand schedule 124 may be subject to one or more constraints other than the COP as discussed above. In addition, the energy demand scheduling module 108 may determine the energy demand schedule 124 using the determined COP, for instance from the COP determination module 104, and a determined energy demand, for instance, from the energy demand determination module 106. A more detailed description of a manner in which the energy demand scheduling module 108 may determine the energy demand schedule 124 is provided hereinbelow with respect to the method 300.

In any regard, the input/output module 102 may output the energy demand schedule 124 for use in managing energy demand for the infrastructure components 202a-202n, for instance, by a central controller and managers (not shown) for the infrastructure. In addition, or alternatively, the energy demand managing apparatus 101 may store the energy demand schedule 124 in the data store 112.

According to an example, the data store 112 comprises volatile or non-volatile memory, such as but not limited to dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 102-108 comprise modules with machine readable instructions stored in the memory. According to a further example, the modules 102-108 of the energy demand managing apparatus 101 comprise a combination of hardware modules and modules with machine readable instructions.

Figure 2:
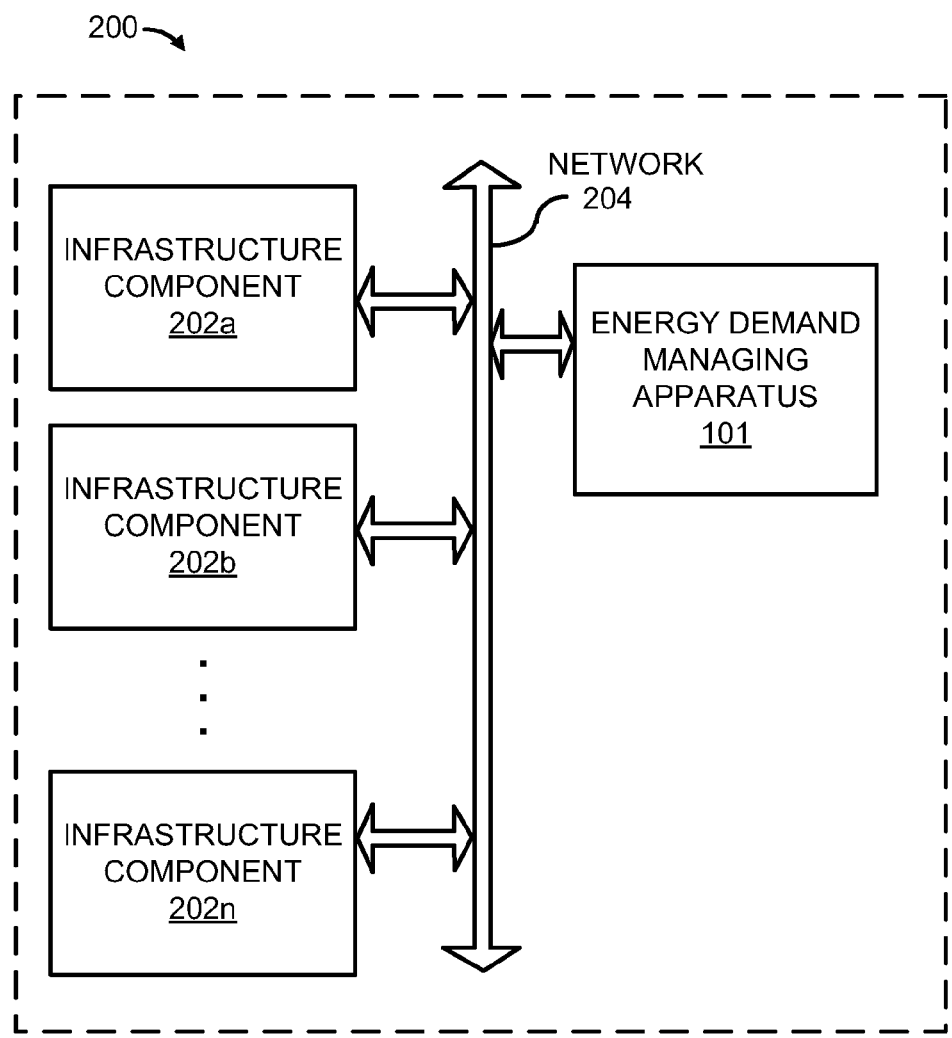
FIG. 2 shows a simplified block diagram of an infrastructure for which energy demand may be managed by an energy demand managing apparatus, according to an example of the disclosure.

Turning now to FIG. 2, there is shown an infrastructure 200 for which energy demand may be managed by the energy demand managing apparatus 101, according to an example. The infrastructure 200 includes infrastructure components 202a-202n. It should be understood that the infrastructure 200 may include additional components and that one or more of the components described herein may be removed and/or modified without departing from a scope of the infrastructure 200.

The infrastructure 200 may comprise, for instance, a server, a rack, a data center or other structure or area housing devices that use energy supplied by an energy supplier. The infrastructure components 202a-202n may comprise components of a server, for instance, processors, power supplies, fans, etc., components of a rack, for instance, servers, power supplies, etc., components of the data center, for instance servers, racks of servers, air conditioning units, etc., or other types of components that consume power during their operations. The infrastructure components 202a-202n are configured to provide information regarding the COP and energy demand to the energy demand managing apparatus 101 through communication with the energy demand managing apparatus 101 over a network 204. As discussed in greater detail below, the energy demand managing apparatus 101 determines an energy demand schedule 124 based on the information regarding the COP and energy demand. In addition, the energy demand schedule 124 may be implemented through a routing of energy demand instructions to the infrastructure components 202a-202n or controllers of the infrastructure components 202a-202n.

According to an example, the infrastructure 200 may comprise multiple clients/customers that communicate with each other to evaluate an aggregate COP of a community of clients/customers. The infrastructure components 202a-202n in this example comprise each customer's energy consuming infrastructure. Alternately, in the absence of direct communication between clients/customers, the clients/customers may provide this information to the utility company, which may then use the energy demand managing apparatus 101 to collate, process, and provide anonymized information to the clients/customers allowing them to compute the aggregate COP. The clients/customers may thereby manage their energy consumption to optimally redistribute their energy demand based on the calculated aggregate COP. According to another example, the aggregate COP may be determined by the energy demand managing apparatus 101 and output to the customers of the energy supplier.

Figure 3:
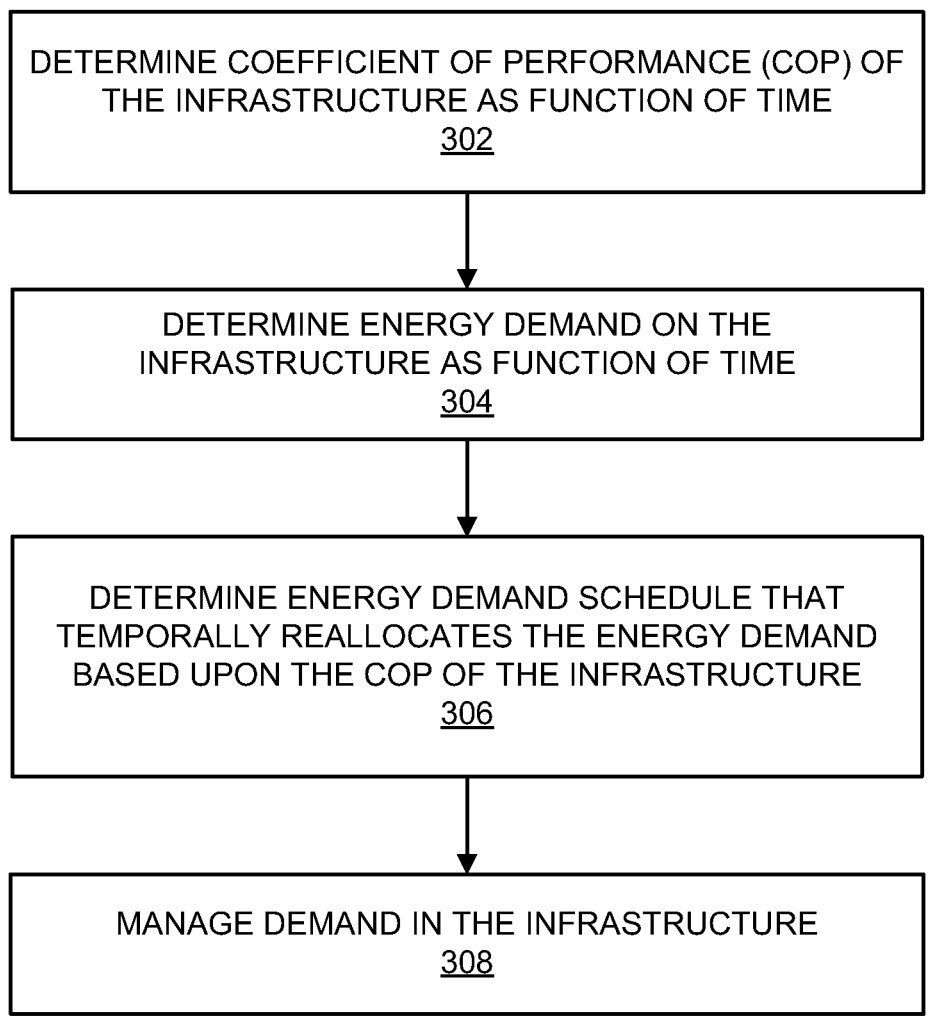
FIG. 3 shows a flow diagram of a method for managing energy demand in an infrastructure, according to an example of the disclosure.

Turning now to FIG. 3, there is shown a flow diagram of a method 300 for managing energy demand in an infrastructure, according to an example. It should be understood that the method 300 may include additional processes and that one or more of the processes described herein may be removed and/or modified without departing from a scope of the method 300.

The description of the method 300 is made with reference to the energy demand managing apparatus 101 and the infrastructure 200 depicted in FIGS. 1-2 and thus makes particular reference to the elements contained in the infrastructure managing apparatus 100 and the infrastructure 200. It should, however, be understood that the method 300 may be implemented in an apparatus that differs from the energy demand managing apparatus 101 without departing from a scope of the method 300.

With particular reference to FIG. 3, at block 302, a COP of the infrastructure as a function of time is determined, for instance, by the COP determination module 104. The COP determination module 104 may determine the COP of the infrastructure based upon data contained in the COP determination information 122, which may include current and predicted weather and other conditions, for instance, a maintenance schedule. These conditions may affect the amount of useful work performed by the infrastructure. The COP determination information 122 may be received as aggregated information from the infrastructure. Alternately, the COP determination information 122 may comprise information received from individual components of the infrastructure. The COP determination module 104 may thereafter aggregate the COP determination information 122 based on proportional contribution of the individual components of the infrastructure. For instance, the aggregate COP for the infrastructure may be determined as follows:

$$COP = D/E,\qquad\text{Eqn. (1)}$$

In Eqn. (1) D is the useful work performed by the infrastructure and E is a total energy consumed in performing the useful work. Eqn. (1) may also be employed to determine the respective COPs for each of the infrastructure components 202a-202n. For cooling systems, Eqn. (1) may be reduced to heat extracted divided by the energy consumed in removing that heat. The COP varies with time depending on various weather conditions, such as but not limited to outside temperature, humidity, etc., and other conditions. The dependence on weather may increase if local generation, such as but not limited to, solar or wind is in use. As discussed above, the COP may be determined with respect to sustainability metrics other than energy consumption, such as but not limited to, carbon emission, exergy, toxicity, etc. Thus, for instance, the COP of the infrastructure may be determined as a function of the useful work performed divided by the amount of carbon that is emitted by the infrastructure in performing the useful work.

At block 304, an energy demand on the infrastructure as a function of time is determined, for instance by the energy demand determination module 106. For example, the energy demand determination module 106 may receive energy demand from each component in the infrastructure. In addition, or alternatively, the energy demand determination module 106 may receive energy demand profiles for the infrastructure components 202a-202n from other sources, which may include information pertaining to the energy demand on the infrastructure components 202a-202n over a period of time. For instance, the energy demand determination module 106 may receive the energy demand profiles of the infrastructure components 202a-202n from a workload manager configured to place workloads on the infrastructure components 202a-202n. As another example, the energy demand determination module 106 may receive the energy demand profiles of the infrastructure components 202a-202n from historical energy demands of the infrastructure components 202a-202n, which may be stored in the data store 112.

At block 306, an energy demand schedule 124 is determined for the infrastructure that temporally reallocates the energy demand on the infrastructure based upon the determined COP of the infrastructure, for instance, by the energy demand scheduling module 108. According to an example, the energy demand schedule 124 ($D_t$) is determined based on the solution for optimization, such as but not limited to:

$$F(D_t) = f(w, D_t, COP_t)\qquad\text{Eqn. (2)}$$

A specific example of Equation 2, according to an example is:

$$F(D_t) = \min \sum_T \frac{\varpi_t D_t}{COP_t},\qquad\text{Eqn. (3)}$$

in which $\Sigma D_t = D_T$, is a total energy demand for the infrastructure 200 that the energy demand managing apparatus 101 is configured to satisfy. In this regard, the individual energy demands $D_t$ may be varied over a period of time, but the total energy demand $D_T$ remains the same over the period of time.

In Eqns. (2) and (3), $D_t$ is the demand or useful work to be performed as a function of time, $\varpi_t$ is a normalizing weight or factor assigned to each demand, and $D_T$ is the total energy demand. $COP_t$ is the aggregate COP of the infrastructure as a function of time. Further, there may be several temporal constraints on $D_t$ depending on the infrastructure components 202a-202n, for instance, equipment/devices/application, and the corresponding service level agreements (SLAs) involved. T is a suitably chosen time period (such as but not limited to a day or a week) based on the characteristics of the demand and COP profile. t is a suitable chosen discretized value of time. Alternately, in instances in which $D_t$ is determined over a continuous time period, Eqns. (2) and (3) may be determined as an integral.

The energy demand of the infrastructure 200 is time indexed using Eqns. (2) and (3). The $D_t$ is thereby determined for a particular instance of time. The $D_t$ is determined for all instances of time under the energy demand schedule 124.

Each $D_t$ is then multiplied by a weighting factor $\overline{\omega}_t$ and the total demand is determined by summing the $D_t$ for each time interval. In instances at which the energy demand is of relatively greater relevance, a lower weighting factor may be assigned. Even though the lower weighting factor leads to greater violation of the summation this is because the demand is relevant. For instance, a lower weighting factor may be assigned to more relevant jobs so that the minimization of the $D_t$ contributes less to the total energy demand.

According to another example, the COP and energy cost may be combined into a utility function and weighed appropriately, in which case, Equation (2) may be written as:

$$F(D_t) = f(w, D_t, U_t),\qquad\text{Eqn. (4)}$$

A specific example of Equation 2, according to an example is:

$$F(D_t) = \min \sum_T \frac{\varpi_t D_t}{U_t}\qquad\text{Eqn. (5)}$$

in which $U_t = f(U_{t\_COP}, U_{t\_COST})$ and in which $D_T = \Sigma D_t$.

In Eqns. (4) and (5), $U_{t\_COP}$ and $U_{t\_COST}$ are utility functions between 0 and 1 and the aggregate COP and energy cost map into $U_{t\_COP}$ and $U_{t\_COST}$, respectively. w is a weighing factor for the COP utility. In this instance, an administrator for the infrastructure 200 may assign an appropriate weight w to the COP to determine a total utility of the infrastructure 200.

In order to address the optimization, for instance as described above in Eqns. (2)-(5), a search algorithm, such as but not limited to, simulated annealing, hill climbing, local beam search, genetic algorithms, etc., may be used to determine an optimal, or close to optimal, demand profile ($D_t$). For instance, a maximum energy demand is determined for the infrastructure 200 when the COP for the infrastructure is maximized. Similarly when the COP for the infrastructure is low, the energy demand for the infrastructure is minimized. The infrastructure 200 is thereby configured to perform more work the efficiency of the infrastructure 200 is relatively higher.

In another example, energy storage devices may be used in conjunction with the energy demand management to enable greater flexibility in energy demand management. Such energy storage devices (not shown) could be electrochemical (for instance, batteries), thermal (for instance, ice), mechanical (for instance, flywheel), etc. The energy storage devices may be employed to, for instance, store energy when the energy costs are relatively low or COP is relatively high; or, the energy storage devices may be employed to, for instance, supply energy to the infrastructure components 202a-202n when the energy costs are relatively high or the COP is relatively low.

At block 308, the energy demand in the infrastructure is managed using the consumption schedule 124. The energy demand may be managed through output of the energy demand schedule 124 to be implemented in the infrastructure components 202a-202n. For example, for energy demands among the infrastructure components 202a-202n that may be delayed, the energy demand schedule 124 delays the energy consumption to periods when the COP is higher. During times when the COP is lower the energy demand schedule 124 reduces demand as much as possible because the infrastructure is not receiving as much value for the energy consumed as at times of relatively higher COP. This may result in a substantially different demand profile than if a demand profile were determined solely using energy consumption or the cost of energy.

Some of the operations set forth in the method 300 may be contained as one or more utilities, programs, or subprograms, in any desired computer accessible or readable medium. In addition, the method 300 may be embodied by a computer program, which may exist in a variety of forms both active and inactive. For example, it can exist as machine readable instructions, including software program(s) comprised of program instructions in source code, object code, executable code or other formats. Any of the above can be embodied on a computer readable medium, which include storage devices and signals, in compressed or uncompressed form.

Example computer readable storage devices include conventional computer system RAM, ROM, EPROM, EEPROM, and magnetic or optical disks or tapes. Example computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 4:
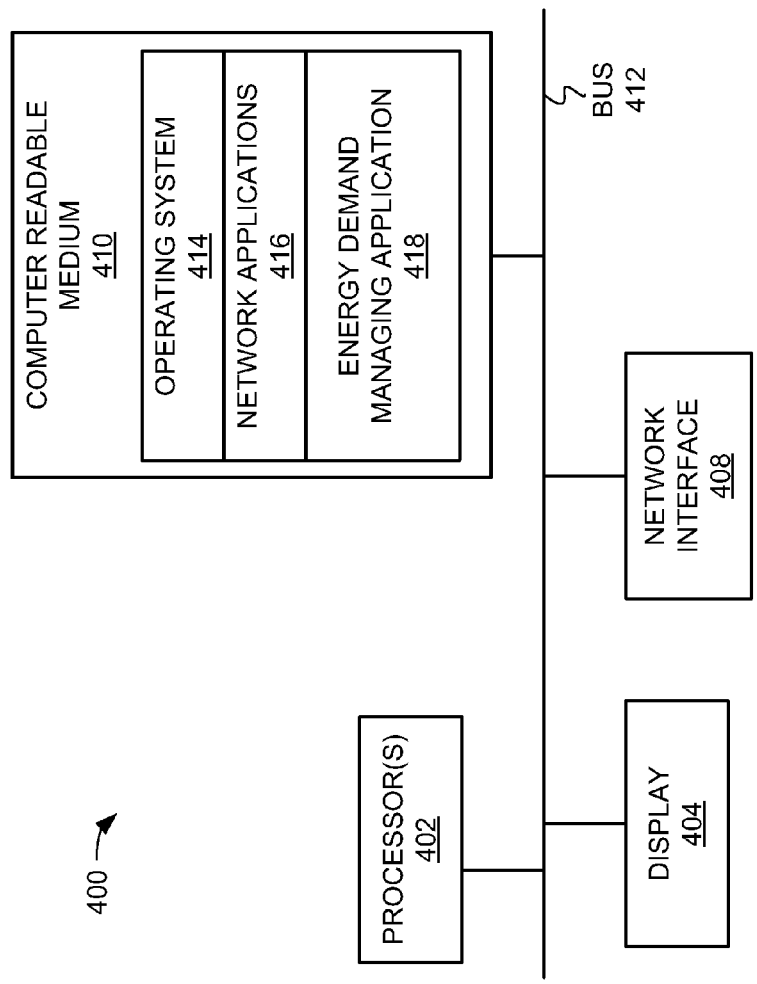
FIG. 4 illustrates a computer system, which may be employed to perform various functions of the system depicted in FIG. 1 in performing some or all of the processes contained in the diagrams depicted in FIG. 3, according to an example of the disclosure.

Turning now to FIG. 4, there is shown a schematic representation of a computing device 400 configured in accordance with examples of the present disclosure. The computing device 400 includes one or more processors 402, such as but not limited to a central processing unit; one or more display devices 404, such as but not limited to a monitor; one or more network interfaces 408, such as but not limited to a Local Area Network LAN, a wireless 802.11x LAN, a 3G mobile WAN or a WiMax WAN; and one or more computer-readable mediums 410. Each of these components is operatively coupled to one or more buses 412. For example, the bus 412 may be an EISA, a PCI, a USB, a FireWire, a NuBus, or a PDS.

The computer readable medium 410 may be any suitable medium that participates in providing instructions to the processor 402 for execution. For example, the computer readable medium 410 may be non-volatile media, such as but not limited to an optical or a magnetic disk; volatile media, such as but not limited to memory; and transmission media, such as but not limited to coaxial cables, copper wire, and fiber optics. Transmission media can also take the form of acoustic, light, or radio frequency waves. The computer readable medium 410 may also store other machine readable instructions, including word processors, browsers, email, Instant Messaging, media players, and telephony software.

The computer-readable medium 410 may also store an operating system 414, such as but not limited to Mac OS, MS Windows, Unix, or Linux; network applications 416; and an energy demand managing application 418. The operating system 414 may be multi-user, multiprocessing, multitasking, multithreading, real-time and the like. The operating system 414 may also perform basic tasks such as but not limited to recognizing input from input devices, such as but not limited to a keyboard or a keypad; sending output to the display 404; keeping track of files and directories on medium 410; controlling peripheral devices, such as but not limited to disk drives, printers, image capture device; and managing traffic on the one or more buses 412. The network applications 416 include various components for establishing and maintaining network connections, such as but not limited to machine readable instructions for implementing communication protocols including TCP/IP, HTTP, Ethernet, USB, and FireWire.

The energy demand managing application 418 provides various components with machine readable instructions for managing energy demand in an infrastructure, as discussed above. In certain examples, some or all of the processes performed by the application 418 may be integrated into the operating system 414. In certain examples, the processes can be at least partially implemented in digital electronic circuitry, or in computer hardware, machine readable instructions (including firmware and software), or in any combination thereof, as also discussed above.

What has been described and illustrated herein are example of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for managing energy demand in an infrastructure, the method comprising:
   determining, by a processor, a coefficient of performance (COP) of the infrastructure as a function of time, wherein the COP is a measure of efficiency of the infrastructure and is determined with respect to a sustainability metric of the infrastructure that includes a metric selected from the group consisting of carbon emission, exergy, and toxicity;
   determining an energy demand on the infrastructure as a function of time; and
   determining an energy demand schedule for the infrastructure that temporally reallocates the energy demand based upon the determined COP of the infrastructure.

2. The method according to claim 1, wherein determining the energy demand schedule for the infrastructure further comprises determining an energy demand schedule that substantially maximizes energy demand on the infrastructure during time periods at which the COP is the highest and that substantially minimizes energy demand on the infrastructure during time periods at which the COP is the lowest.

3. The method according to claim 1, wherein determining the energy demand schedule further comprises determining the temporal reallocation of the energy demand subject to one or more additional constraints, wherein the one or more additional constraints pertain to factors other than the COP and energy costs.

4. The method according to claim 1, wherein determining the energy demand schedule for the infrastructure further comprises determining the energy demand schedule using:

$$F(D_t)=f(w,D_t,COP_t),$$

wherein $F(D_t)$ is the energy demand schedule for the infrastructure, $D_t$ is an individual energy demand of a component of the infrastructure to be performed as a function of time, w is a normalized weight assigned to each of the individual energy demands based on a predetermined relevance, and $COP_t$ is an aggregate COP of the infrastructure as a function of time.

5. The method according to claim 1, further comprising:
   receiving information from each of a plurality of infrastructures, wherein the information from each of the plurality of infrastructures includes an energy demand for each of the plurality of infrastructures; and
   wherein determining the COP further comprises determining an aggregate COP of the plurality of infrastructures based on the received information from each of the plurality of infrastructures.

6. The method according to claim 1, wherein determining the energy demand schedule for the infrastructure further comprises employing a search algorithm to solve for an optimization to determine the energy demand schedule, wherein the search algorithm is selected from a group consisting of simulated annealing, hill climbing algorithm, local beam search, and genetic algorithm.

7. The method according to claim 1, wherein determining the energy demand schedule for the infrastructure further comprises determining the energy demand schedule using:

$$F(D_t)=f(w,D_t,U_t)$$

wherein $F(D_t)$ is the energy demand for the infrastructure, $D_t$ is an individual energy demand of a component of the infrastructure to be performed as a function of time, w is a normalized weight assigned to each of the individual energy demands based on a predetermined relevance, and $$U_t=f(U_{t\_COP}, U_{t\_COST}),$$

wherein $U_{t\_COP}$ and $U_{t\_COST}$ are utility functions between 0 and 1 and an aggregate COP is mapped into $U_{t\_COP}$ and an aggregate energy cost map is mapped into $U_{t\_COST}$.

8. The method according to claim 1, wherein determining the energy demand schedule further comprises determining the energy demand schedule to reallocate the energy demand from time periods at which the COP is relatively high to time periods at which the COP is relatively low through use of one or more energy storage devices.

9. The method according to claim 1, wherein determining the COP of the infrastructure includes evaluating a function of useful work performed by the infrastructure divided by the sustainability metric corresponding to performance of the useful work.

10. An apparatus for managing energy demand in an infrastructure, the apparatus comprising:
    a processor; and
    a memory device comprising machine-readable instructions that when executed by the processor causes the processor to:
        determine a coefficient of performance (COP) of the infrastructure as a function of time, wherein the COP is a measure of efficiency of the infrastructure determined with respect to a sustainability metric of the infrastructure that includes a metric selected from the group consisting of carbon emission, exergy, and toxicity,
        determine an energy demand on the infrastructure as a function of time, and
        determine an energy demand schedule for the infrastructure that temporally reallocates the energy demand based upon the determined COP of the infrastructure.

11. The apparatus according to claim 10, wherein the machine-readable instructions are further to cause the processor to determine an energy demand schedule for the infrastructure that substantially maximizes energy demand on the infrastructure during time periods at which the COP is the highest and that substantially minimizes energy demand on the infrastructure during time periods at which the COP is the lowest.

12. The apparatus according to claim 10, wherein the machine-readable instructions are further to cause the processor to determine the temporal reallocation of the energy demand subject to one or more additional constraints, wherein the one or more additional constraints pertain to factors other than the COP and energy costs.

13. The apparatus according to claim 10, wherein the machine-readable instructions are to cause the processor to determine the energy demand schedule for the infrastructure using:

$$F(D_t)=f(w,D_t,COP_t),$$

wherein $F(D_t)$ is energy demand schedule for the infrastructure, $(D_t)$ is an individual energy demand of a component of the infrastructure to be performed as a function of time, w is a normalized weight assigned to each of the individual energy demands based on a predetermined relevance, and $COP_t$, is an aggregate COP of the infrastructure as a function of time.

14. The apparatus according to claim 10, wherein the machine-readable instructions are further to cause the processor to determine the energy demand schedule to reallocate the energy demand from time periods at which the COP is relatively high to time periods at which the COP is relatively low using one or more energy storage devices.

15. The apparatus according to claim 10, wherein the one or more modules are to determine the energy demand schedule for the infrastructure, wherein the COP of the infrastructure is determined as a function of useful work performed by the infrastructure divided by the sustainability metric in performing the useful work.

16. The apparatus according to claim 10, wherein the machine-readable instructions are further to determine the energy demand schedule for the infrastructure using:

$$F(D_t)=f(w,D_t,U_t),$$

wherein $F(D_t)$ is the energy demand schedule for the infrastructure, $D_t$ is an individual energy demand of a component of the infrastructure to be performed as a function of time, w is a normalized weight assigned to each of the individual energy demands based on a predetermined relevance, and $$U_t=f(U_{t\_COP},U_{t\_COST}),$$

wherein $U_{t\_COP}$ and $U_{t\_COST}$ are utility functions between 0 and 1 and an aggregate COP is mapped into $U_{t\_COP}$ and an aggregate energy cost map is mapped into $U_{t\_COST}$.

17. A non-transitory computer readable storage medium on which is embedded one or more computer programs, said one or more computer programs to be executed by a processor to implement a method for managing energy demand in an infrastructure, wherein said one or more computer programs, when executed by the processor, are to cause the processor to:
  determine a coefficient of performance (COP) of the infrastructure as a function of time, wherein the COP is a measure of efficiency of the infrastructure and is determined with respect to a sustainability metric of the infrastructure that includes a metric selected from the group consisting of carbon emission, exergy, and toxicity;
  determine an energy demand on the infrastructure as a function of time; and
  determine an energy demand schedule for the infrastructure that temporally reallocates the energy demand based upon the determined COP of the infrastructure.

18. The non-transitory computer readable storage medium according to claim 17, wherein to determine the COP of the infrastructure, said one or more computer programs further comprises computer readable code to cause the processor to evaluate a function of useful work performed by the infrastructure divided by the sustainability metric corresponding to performance of the useful work.

* * * * *

UNITED STATES PATENT AND TRADEMARK OFFICE
CERTIFICATE OF CORRECTION

PATENT NO. : 8,565,931 B2  
APPLICATION NO. : 12/913368  
DATED : October 22, 2013  
INVENTOR(S) : Manish Marwah et al.

Page 1 of 1

It is certified that error appears in the above-identified patent and that said Letters Patent is hereby corrected as shown below:

In the Claims

In column 9, line 61, in Claim 4, delete "$COP_t$," and insert -- $COP_t$ --, therefor.

In column 10, line 15, in Claim 7, after "$U_t$)" insert -- , --.

In column 10, line 17, in Claim 7, after "demand" insert -- schedule --.

In column 11, line 8, in Claim 13, delete "energy" and insert -- the energy --, therefor.

In column 11, line 9, in Claim 13, delete "$(D_t)$" and insert -- $D_t$ --, therefor.

In column 11, line 12, in Claim 13, delete "$COP_t$," and insert -- $COP_t$ --, therefor.

Signed and Sealed this  
Third Day of June, 2014

Michelle K. Lee  
*Deputy Director of the United States Patent and Trademark Office*